United States Patent [19]

McCarren

[11] Patent Number: 4,744,094
[45] Date of Patent: May 10, 1988

[54] BPSK DEMODULATOR WITH D TYPE FLIP/FLOP

[75] Inventor: Daniel S. McCarren, Schaumburg, Ill.

[73] Assignee: Zenith Electronics Corporation, Glenview, Ill.

[21] Appl. No.: 940,822

[22] Filed: Dec. 12, 1986

[51] Int. Cl.[4] ............................................. H04L 27/22
[52] U.S. Cl. ...................................... 375/81; 329/105; 329/124
[58] Field of Search ............................. 375/80, 81, 83; 329/104, 110, 124, 105; 328/72, 133; 360/51; 307/269

[56] References Cited

U.S. PATENT DOCUMENTS

| 3,312,901 | 4/1967 | Becker et al. | 375/81 |
| 3,908,115 | 9/1975 | Waggener | 375/81 |
| 4,222,009 | 9/1980 | Moulton et al. | 307/269 |
| 4,380,815 | 4/1983 | Clendening | 375/81 |
| 4,575,684 | 3/1986 | Stamm | 329/124 |

Primary Examiner—Benedict V. Safourek

[57] ABSTRACT

A BPSK demodulator includes a D type flip-flop having a clock terminal supplied with the output of a phase locked loop (PLL). The ouput of the D flip-flop and the carrier are provided as inputs to an exclusive OR gate, the output of which is used to lock up the PLL. The VCO in the PLL is phase displaced 90° with respect to the carrier such that the carrier is sampled to detect the data.

5 Claims, 3 Drawing Sheets 4,744,094

BPSK DEMODULATOR WITH D TYPE FLIP/FLOP

BACKGROUND OF THE INVENTION AND PRIOR ART

This invention relates generally to phase shift keying (PSK) data signalling systems and specifically to a new demodulator for use in a binary phase shift keying (BPSK) signalling system.

In BPSK signalling systems, two 180° displaced phases of the carrier are used to indicate a "0" and a "1", respectively. The BPSK signal is generated by applying a data waveform and a carrier to a balanced modulator, the output of which is a double sideband suppressed carrier signal. Demodulation requires a carrier at the receiver having a phase that is close to one phase of the incoming BPSK signal.

The circuit that generates the carrier from the BPSK signal is called a carrier synchronizer. One configuration of a carrier synchronizer, called a remodulator loop, is shown in FIG. 1. In FIG. 1, an input signal is demodulated by a demodulator 1 and the recovered baseband signal is supplied to a low pass filter to remove the higher frequencies generated by the demodulation process. The baseband signal is supplied to a bit detector (not shown) and applied to a balanced modulator 7. The input signal is passed through a delay line 8 and applied to balanced modulator 7. The delay line is necessary to compensate for the low pass filter delay of the baseband signal. The output of the balanced modulator is connected to a phase detector 6 in a phase locked loop (indicated by the dashed line box). The balanced modulator output contains a carrier component at the input frequency for the PLL (Phase Lock Loop) to lock on. The PLL includes a voltage controlled oscillator (VCO) 3, a 90° phase shift circuit 4 and a low pass filter 5, all of conventional construction. Since the PLL locks at −90° relative to its reference, the input from VCO 3 to phase detector 6 is shifted by 90° to enable the VCO output signal to demodulator 1 to be in phase with one of the phases of the input signal.

The circuit of the present invention, while based on the remodulator concept, uses simple logic gates. The inventive circuit is readily integrated and does not require the balanced modulator and multipliers of the prior art resulting in a cost saving. The inventive circuit also uses a novel sampling technique to demodulate a BPSK signal.

OBJECTS OF THE INVENTION

A principal object of the invention is to provide an improved BPSK carrier demodulator.

Another object of the invention is to provide a novel BPSK carrier demodulator that may be readily fabricated in an integrated circuit form.

A further object of the invention is to provide a low cost BPSK carrier demodulator that uses simple logic gates.

BRIEF DESCRIPTION OF THE DRAWINGS

These and other objects and advantages of the invention will be apparent upon reading the following description in conjunction with the drawings in which.

DESCRIPTION OF THE PREFERRED EMBODIMENT

Figure 2:
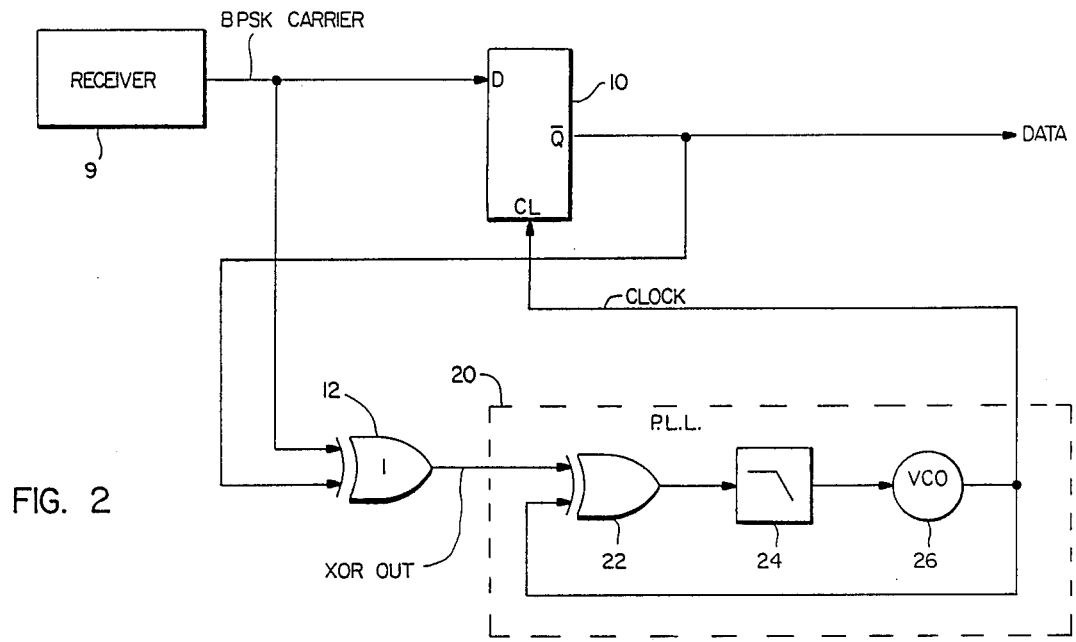
FIG. 2 is a simplified block diagram of a demodulator constructed in accordance with the invention.

Referring to FIG. 2, a receiver 9 includes means for receiving a transmitted signal and converting it to a BPSK carrier signal. The data is represented by the two opposite phase of the BPSK carrier wave. The BPSK carrier signal is supplied to the D terminal of a D type flip-flop (FF) 10 and to one input of a two input exclusive OR gate (XOR) 12. The $\bar{Q}$ output of FF 10 supplies the demodulated data and is also coupled to the other input of XOR 12, the output of which is supplied to one input of an exclusive OR gate 22 that is part of a PLL 20, indicated by the dashed line rectangle. The output of XOR 22 is filtered by a low pass filter 24 and supplied to a VCO 26. The output of VCO 26 is supplied to both the second input of XOR 22 and to the clock input of FF 10.

Figure 3:
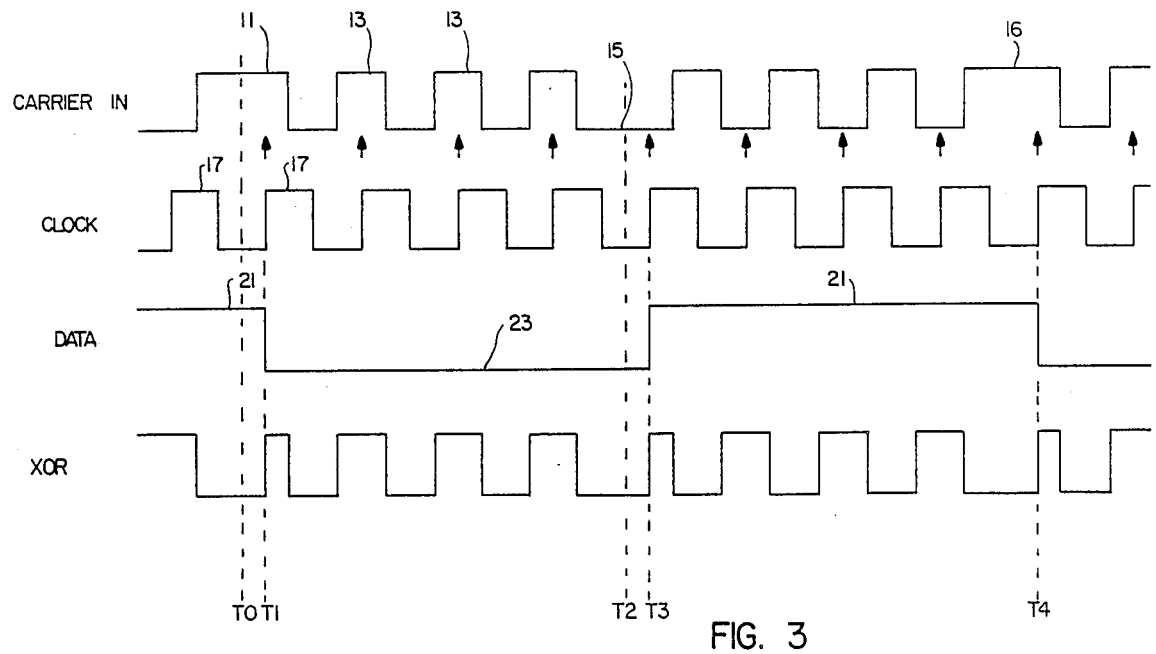
FIG. 3 is a series of waveforms useful in understanding the operation of the demodulator of the invention.

FIG. 3 displays the input carrier, the clock signal, the data output signal and the output of XOR 12 in their proper time relationship to each other. The carrier is seen as a series of regular square wave pulses 13 with areas of carrier reversal indicated as 11, 15 and 16. The clock waveform is a series of square wave pulses 17 of the same frequency and duty cycle as the carrier wave but being 90° phase displaced therefrom.

Figure 1:
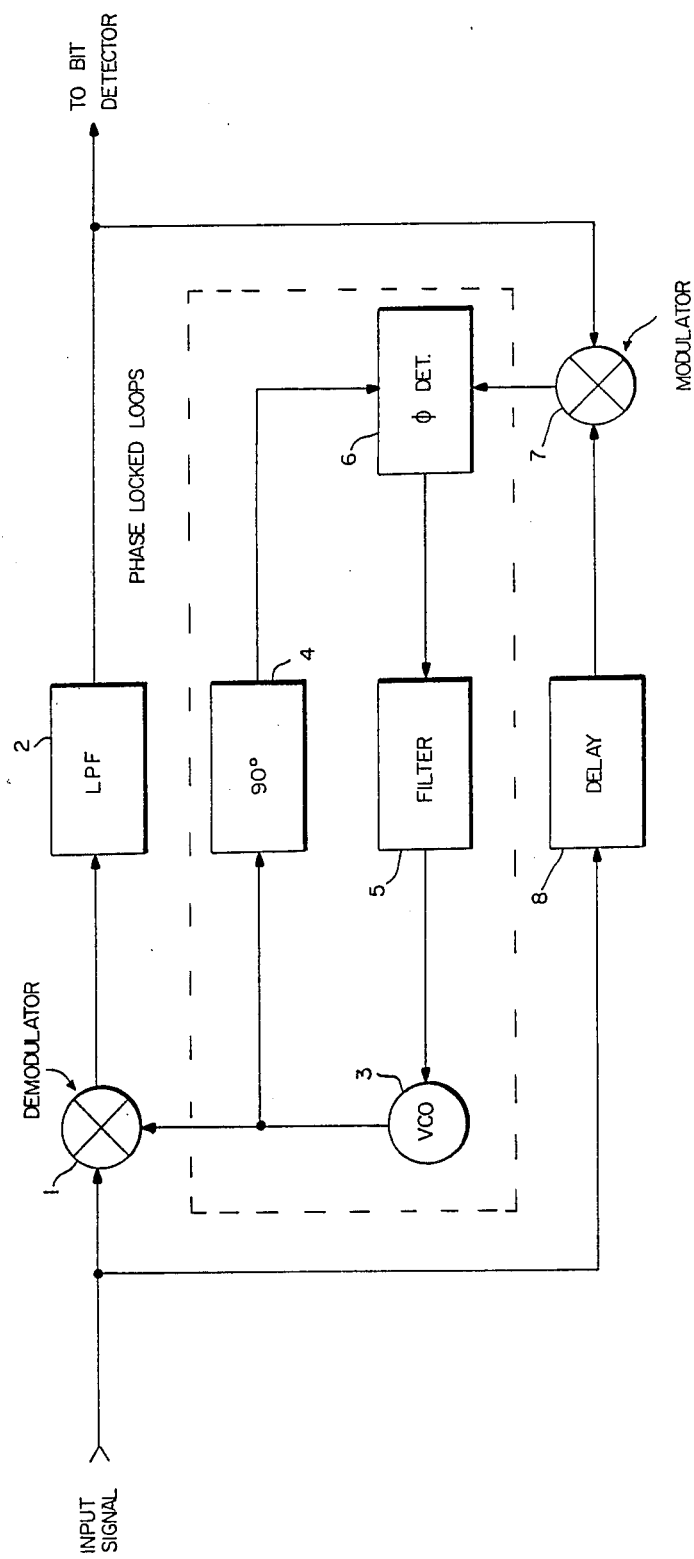
FIG. 1 is a simplified block diagram of a prior art remodulator carrier synchronizer.

The operation of the invention can best be understood by reference to FIGS. 2 and 3. The BPSK demodulator in the inventive circuit is a simple D flip-flop 10 rather than of the multiplier 1 of the remodulator circuit of FIG. 1. Also, the balanced modulator 7 and phase detector 6 of FIG. 1 are replaced by XORs 12 and 22. There is also no need for low pass filter 2, delay line 8 and 90° phase shift circuit 4 in the digital implementation of the invention.

Receiver 9 receives a BPSK signal and converts it to an intermediate frequency signal suitable for processing by the circuit of the invention. The input signal to receiver 9 is a low level, high frequency sine wave and its output is a high level, low frequency square wave.

Referring to the BPSK carrier in FIG. 3, assume it could be sampled at the same point of each cycle, as indicated by the arrows. During the time interval T0 to T2, the sample value at each arrow is a logic high. Over time interval T2 to T4, the sample value at each arrow is a logic low. The two time intervals (T0 to T2 and T2 to T4) represent the two phases of the BPSK carrier. Thus a BPSK signal can be demodulated by sampling at the same time in the carrier cycle and latching the result.

At a time T1, a logic high is latched into FF 10 (FIG. 2) at the rising edge of the clock signal. A logic low will appear at the inverted output of FF 10. The latched value of the output of FF 10 cannot change until the next rising edge of the clock signal. Note that the output of the FF 10 does not change until T3, at which time the BPSK input has experienced a 180° phase shift. At T3, a logic low is latched into FF 10 and the data waveform changes polarity. The output of FF 10 does not again change until T4. Prior to T4, the BPSK input carrier experienced a 180° phase shift. Thus, each time there is a phase reversal in the input carrier, the output of FF 10 changes polarity.

In this demodulation scheme, the clock signal is locked to the incoming signal and offset 90° from the incoming carrier phases to insure that sampling occurs in the middle of the transitions of the carrier square wave. The PLL generates this clock signal and it must obtain its reference from the BPSK signal, the carrier component of which is suppressed. If the phase reversals of the incoming BPSK are cancelled out, the resulting waveform will contain a carrier. The recovered data waveform indicates when these phase reversals occur and the data waveform changes polarity whenever the BPSK signal reverses its phase. Thus, the data waveform can be utilized for cancelling the modulation. This process is illustrated in FIG. 3. The data from FF 10 is applied to one input of XOR 12 and the BPSK to the other input. At T0, the input carrier phase changes 180°. At T1, the data changes polarity and reverses the 180° phase of the carrier so that the output waveform of XOR 12 has no phase reversal. At T2, the carrier phase changes 180° which is followed by a data polarity change at T3, again cancelling the carrier reversal. Thus, the output of XOR 12 provides an unmodulated signal for the PLL to lock on.

The output of XOR 12 is applied to one input of XOR 22 which is the phase detector for the PLL. Since the phase detector is an Exclusive OR gate, the VCO 26 output will be at −90° with respect to the XOR 12 output signal if the VCO free running frequency is close to the input signal frequency. The VCO 26 output is used as the clock signal for the demodulator. Low pass filter 24 filters out the higher frequency components that appear at the output and also determines the noise bandwidth and locking range of the PLL.

Figure 4:
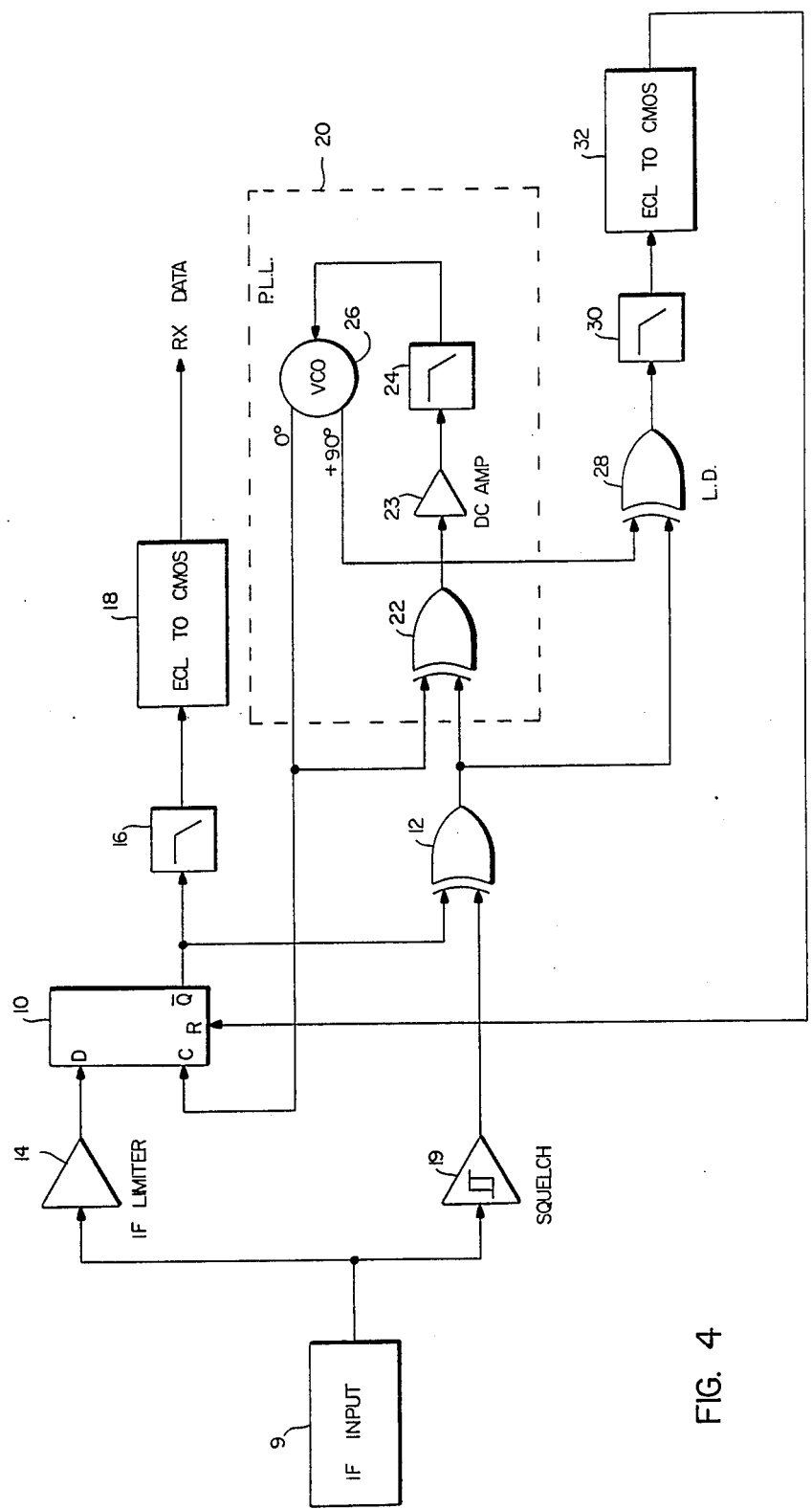
FIG. 4 is a more complete block diagram of the demodulator of the invention.

FIG. 4 shows the block diagram of the complete demodulator. Before the demodulation process can occur, the system must be initialized by sending an unmodulated carrier for a sufficient time to allow the PLL to lock. Once the system is synchronized to the carrier, the BPSK suppressed carrier signal can be sent. This is accomplished by setting the data input to the BPSK transmitter to a logic high at the beginning of each packing transmission for about 100 microseconds. At the receiver, the data line must be held high until lock occurs. This is done by applying a lock detect signal to the reset input of FF 10 which forces the output high until an indication of lock occurs. The lock detect line goes low when the PLL is locked. With this arrangement the received data will always be of the proper polarity and not inverted.

The demodulator of FIG. 4 is the same as that of FIG. 2 with the addition of a lock detector circuit and logic converters for coupling EGL logic circuitry with CMOS logic circuitry. Receiver 9 comprises an IF input source of signal at about 44.25 MHz and is supplied to an IF limiter 14 to the input of FF 10. The output of receiver 9 is also supplied to a shut-down (squelch) circuit 19 that disables the system for signals that fall below a particular amplitude. VCO 26 in PLL 20 has two output signals, one at zero degrees and one at 90°. The +90° output signal is used for operating a lock detector 28. Lock detector 28 comprises an exclusive OR gate having one input supplied with the 90° output signal from VCO 26 and the other input supplied with the output of XOR 12 which, except for transitions in data, is +90° phase displaced from the clock signal. Thus when the VCO is in proper sync, both inputs of lock detector 28 are in phase and its output is low. The output of lock detector 28 is supplied through a low pass filter 30 to the input of an ECL to CMOS logic converter 32. The output of logic converter 32 is supplied to the reset terminal of FF 10. Similarly, the $\overline{Q}$ output of FF 10 is supplied to a low pass filter 16 to the input of another ECL to CMOS logic converter 18 which delivers the data to the CMOS data receiver (not shown). Filter 16 is provided for the small amount of spurious signals developed during operation of FF 10. PLL 20 includes a DC amplifier 23 between XOR 22 and low pass filter 24 in accordance with conventional practice.

As mentioned previously, the prior art remodulation systems used in phase signals were multiplied together to generate the PSK data. The present invention, in a much simpler manner, samples the carrier to detect the data and thus avoids the edges of the carrier wave pulses. The 90° phase displacement assures sampling in the mid portions of the carrier pulses.

Thus, with the invention, data in the form of a phase shift keyed carrier wave may be detected without requiring multiplication circuitry or extensive filtering at baseband frequencies. Further, the demodulator includes simple logic gates that make possible an integrated circuit format. The invention is to be limited only as defined in the claims.

What is claimed is:

1. A BPSK demodulator comprising:
   means receiving a carrier modulated with data in BPSK form;
   a PLL source of clock signal that is 90° displaced with respect to said carrier;
   demodulation means comprising a D flip-flop having one input for receiving said carrier, another input for receiving said clock signal and an output for producing said data; and
   gate means supplied with said data and with said carrier for supplying a locking signal to said PLL.

2. The demodulator of claim 1, wherein said gate means includes an exclusive OR gate receiving inputs of said carrier and said data and supplying an output to said PLL.

3. The demodulator of claim 2, further including a lock detector having inputs supplied by said exclusive OR gate and said PLL and being coupled to control operation of said D flip-flop.

4. A BPSK demodulator comprising:
   means receiving a carrier modulated with data in BPSK form;
   a PLL source of clock signal that is 90° phase displaced with respect to said carrier;
   a demodulator including a D flip-flop having one input receiving said carrier, another input receiving said clock signal and an output producing said data; and
   an exclusive OR gate supplied with said data and with said carrier for supplying a locking signal to said PLL.

5. The demodulator of claim 4, further including a lock detector having inputs supplied by said exclusive OR gate and said PLL and being coupled to control operation of said D flip-flop.

* * * * *